United States Patent
Li et al.

(10) Patent No.: US 6,595,469 B2
(45) Date of Patent: Jul. 22, 2003

(54) ATTITUDE CONTROL METHODS AND SYSTEMS FOR MULTIPLE-PAYLOAD SPACECRAFT

(75) Inventors: Rongsheng Li, Hacienda Heights, CA (US); Yeong-Wei A. Wu, Rancho Palos Verdes, CA (US); Hanching Grant Wang, Hacienda Heights, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/039,474

(22) Filed: Oct. 28, 2001

(65) Prior Publication Data

US 2003/0080255 A1 May 1, 2003

(51) Int. Cl.$^7$ ................................................. B04G 1/22
(52) U.S. Cl. .................... 244/158 R; 244/164; 244/171; 342/354; 343/711; 343/757; 343/DIG. 2; 701/13
(58) Field of Search ................................ 244/164, 165, 244/170, 171, 158 R, 173; 342/354; 248/550, 556, 567, 636, 638; 343/DIG. 2, 720, 711, 757; 701/13

(56) References Cited

U.S. PATENT DOCUMENTS

| | | | | |
|---|---|---|---|---|
| 5,587,714 A | * | 12/1996 | Chu et al. | 342/354 |
| 6,000,661 A | | 12/1999 | Price | |
| 6,022,005 A | * | 2/2000 | Gran et al. | 244/164 |
| 6,263,264 B1 | | 7/2001 | Herman | |

* cited by examiner

Primary Examiner—Galen L. Barefoot
(74) Attorney, Agent, or Firm—Koppel, Jacobs, Patrick & Heybl

(57) ABSTRACT

Attitude determination and control systems are provided that combine attitude measurements from all spacecraft payloads to determine a master attitude estimate for a master payload and relative slave attitude estimates for the remaining slave payloads. These estimates are then used to control the attitudes of spacecraft elements that correct the absolute and relative attitude errors. These systems significantly enhance attitude accuracy when compared to systems that realize independent payload estimates, determine payload attitudes. These systems also provide significant processing advantages (e.g., simpler algorithms, reduced data throughput and slower processing rate).

28 Claims, 4 Drawing Sheets

ATTITUDE CONTROL METHODS AND SYSTEMS FOR MULTIPLE-PAYLOAD SPACECRAFT

BACKGROUND OF THE INVENTION

1. Field of the Invention

The present invention relates generally to spacecraft and, more particularly, to spacecraft attitude control systems.

2. Description of the Related Art

The diagram 20 of FIG. 1 illustrates a conventional spacecraft 22 that orbits in an orbital plane 23 about the earth 24. Although the spacecraft's orbital plane may be coplanar with the earth's equatorial plane 25, it is shown, for generality, as having an inclination 26.

Spacecraft generally carry a payload which facilitates performance of the spacecraft's intended service. An exemplary service provides communications for a service area (e.g., the area 28 on the earth 24) and, accordingly, the spacecraft's body 30 carries a corresponding payload 32 which includes antennas 33. The body also carries solar panels 34 which provide electrical current to operate the payload and an attitude control system which maintains a spacecraft service attitude that is necessary to carry out the service. The attitude control system generally includes an attitude determination system which generates an attitude estimate in response to attitude measurements from spacecraft attitude sensors.

As spacecraft have evolved, their service demands have generally increased which has caused their payloads to become more complex so that many spacecraft now carry multiple payloads. Despite great care in design and fabrication, small relative attitude errors generally exist between these multiple payloads. More significantly, relative attitude errors are generated by differential thermal heating as the spacecraft rotates relative to the sun and passes in and out of the earth's shadow. This differential heating induces thermal deformations and consequent relative attitude errors that often exceed the spacecraft's design budget. Conventional spacecraft systems that determine a single attitude cannot remove these significant relative errors.

SUMMARY OF THE INVENTION

The present invention is directed to attitude control methods and systems for multiple-payload spacecraft. The invention recognizes that payload attitudes must be determined to reduce relative attitude errors between payloads. The invention thus provides an integrated attitude determination architecture that combines attitude measurements from all payloads to determine a master attitude estimate for a master payload and relative slave attitude estimates for the remaining slave payloads. These estimates are then used to control the attitudes of spacecraft elements that correct the absolute and relative attitude errors.

It has been found that systems of the invention significantly enhance the accuracy of the attitude estimates when compared to systems that realize independent payload estimates, determine payload attitudes. In addition, it has been found that estimating relative slave attitudes provides significant processing advantages (e.g., simpler algorithms, reduced data throughput and slower processing rate) when compared to other methods.

The novel features of the invention are set forth with particularity in the appended claims. The invention will be best understood from the following description when read in conjunction with the accompanying drawings.

DETAILED DESCRIPTION OF THE INVENTION

Figure 1:
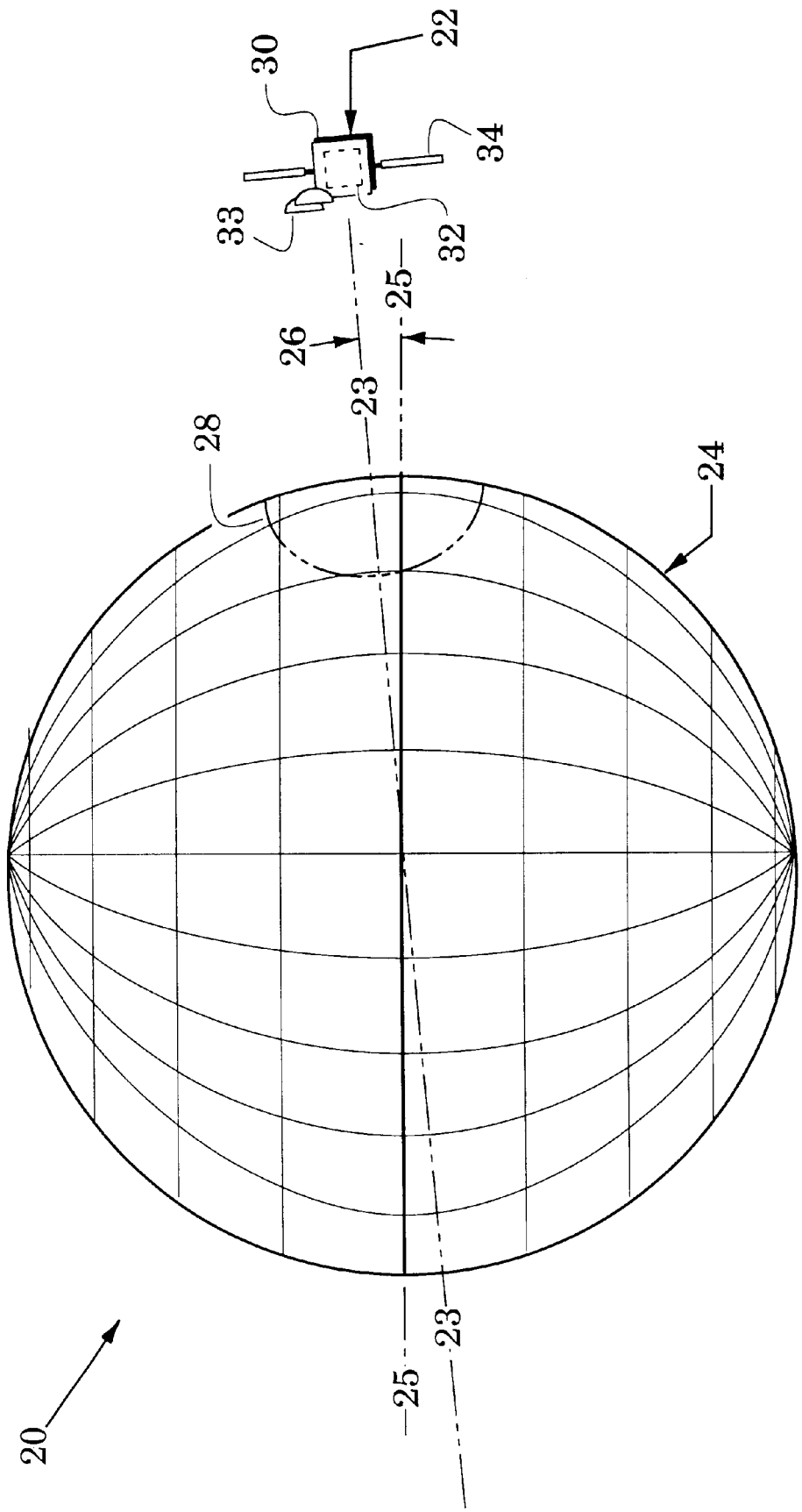
FIG. 1 is a diagram of a conventional spacecraft in an orbit about the earth.
Figure 2:
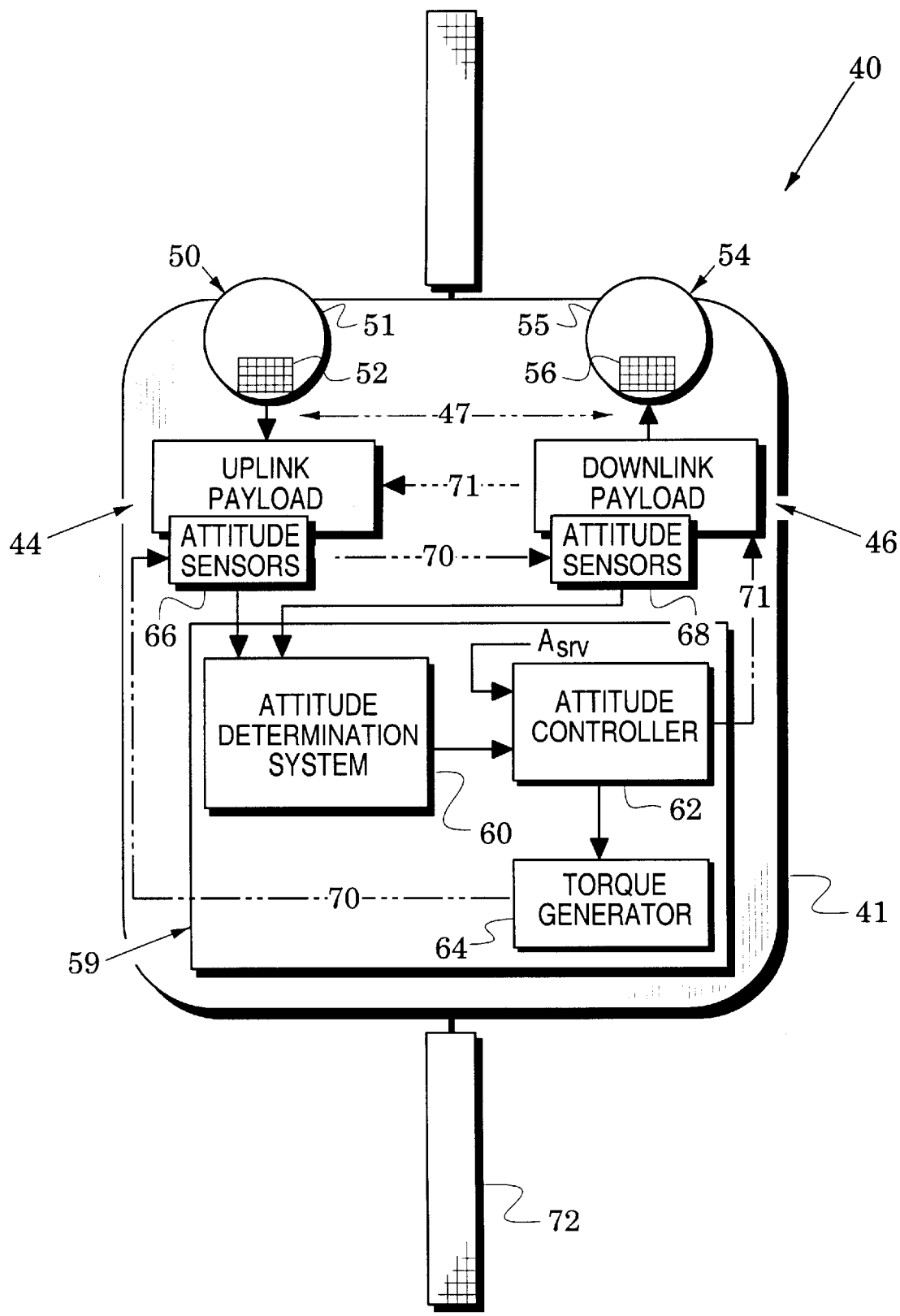
FIG. 2 is a schematized view of a spacecraft and attitude control system of the present invention.

FIG. 2 illustrates a spacecraft embodiment 40 which performs a service with multiple spacecraft payloads. In this embodiment, the spacecraft has a body 41 and provides a communication service for a service area (e.g., the service area 28 in FIG. 1) with an uplink payload 44 and a downlink payload 46 that are carried by the body 41 and are separated by a body space 47.

The uplink payload 44 receives communication signals with a receive antenna 50 (having, for example, a reflector 51 and a horn array 52) that couples received signals to receivers in the remainder of the uplink payload. With a transmit antenna 54 (having, for example, a reflector 55 and a horn array 56), the downlink payload 46 radiates communication transmit signals that are generated by transmitters in the remainder of the downlink payload.

In order to provide its intended service to the service area, the spacecraft must be maintained in a corresponding service attitude $A_{srv}$. Therefore, the spacecraft body 41 carries an attitude control system 59 which includes an attitude determination system 60, an attitude controller 62 and a torque generator 64. The attitude control system also includes at least one attitude sensor 66 that is positioned proximate to the uplink payload 44 and at least one attitude sensor 68 that is positioned proximate to the downlink payload 46 (e.g., the sensors can be within the payloads).

Because of differential thermal heating and because the uplink and downlink payloads 44 and 46 are separated by the body space 47, thermal deformation of the body 41 induces significant relative attitude errors between the payloads. Accordingly, the attitude determination system 60 provides a master attitude estimate $X_m{}^*$ and at least one slave relative attitude estimate $X_{s_{rel}}{}^*$. In response to these attitude estimates and to the service attitude $A_{srv}$, the controller 62 provides control signals to the torque generator 64 that generates torques in the body 41 that urge the spacecraft to its service attitude $A_{srv}$. Attitude corrections in the body form a feedback path 70 to the attitude sensors 66 and 68. In additional response to the attitude estimates, the payloads may alter the alignment of one or more of the payload antenna beams as indicated by alignment signal paths 71 to the payloads 44 and 46. The spacecraft systems are powered by currents generated in solar panels 72.

Figure 3:
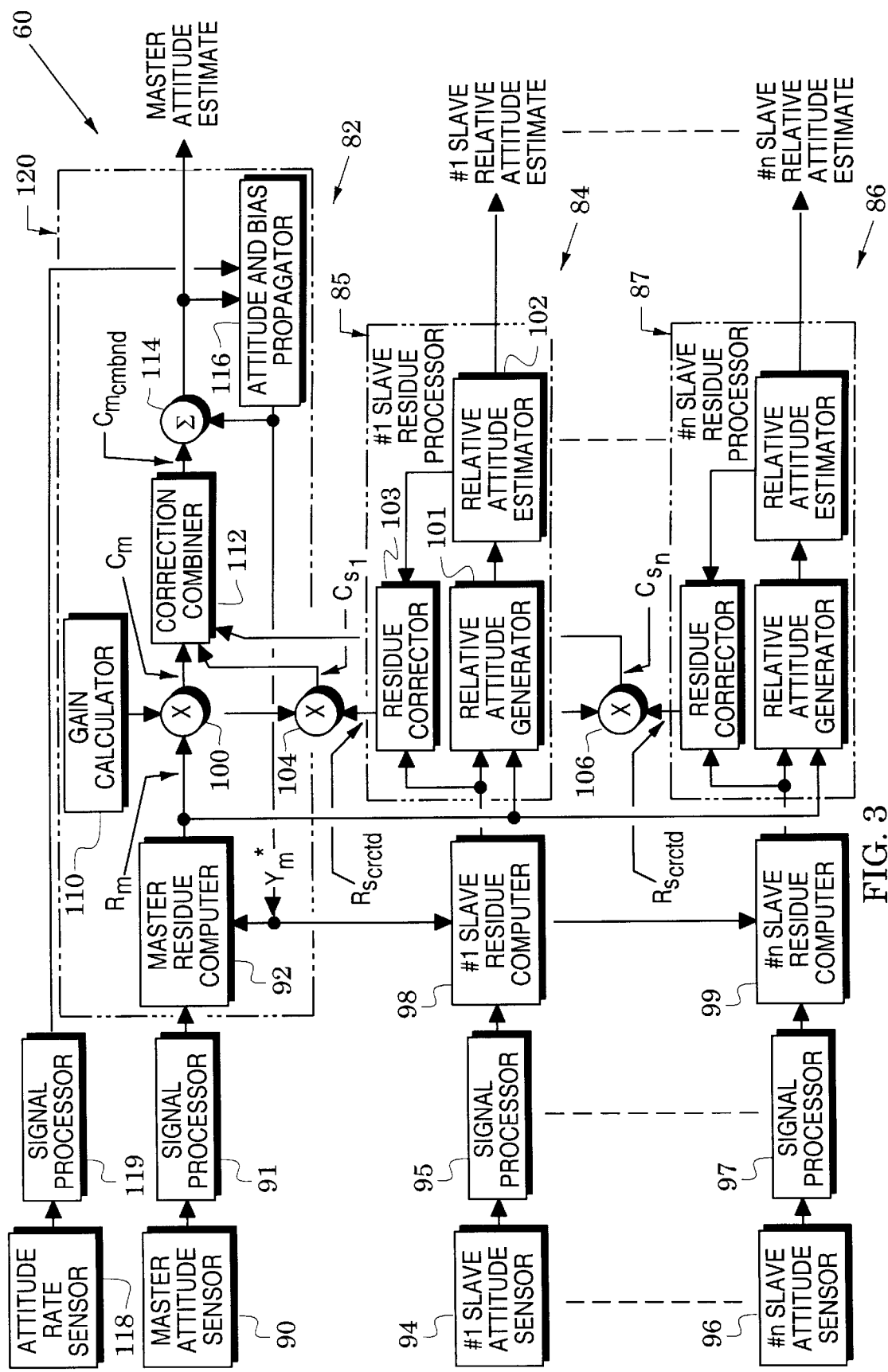
FIG. 3 is a block diagram of an attitude determination system of FIG. 2.

Attention is now directed to FIG. 3 for a description of the attitude determination system 60. To facilitate this description, attitude measurements are designated as Y, predicted attitudes as Y*, actual attitudes as X and attitude estimates as X*. To further facilitate this description, the uplink and downlink payloads 44 and 46 of FIG. 2 are respectively referenced as a master and a slave payload. The attitude determination system 60 of FIG. 3 has corresponding master and first slave portions 82 and 84. Although the spacecraft 40 of FIG. 2 only carries two payloads, FIG. 3 is also arranged to more generally indicate attitude determination in association with a plurality of slave payloads. It thus also includes an nth slave portion 86.

In the attitude determination system 60, the master portion 82 forms a master residual $R_m$. The slave portions 84 and 86 each form slave residuals $R_s$ which are processed in slave residual processors 85 and 87 to derive slave relative attitude estimates $X_{s_{rel}}*$ and corrected slave residuals $R_{s_{crctd}}$. The master residual $R_m$ and the corrected slave residuals $R_{s_{crctd}}$ are filtered to realize a master attitude estimate $X_m*$. The attitudes of the payloads are thereby determined by the master attitude estimate $X_m*$ and the slave relative attitude estimates $X_{s_{rel}*}$.

In particular, the master portion 82 receives successive master attitude measurements $Y_m$ from a master attitude sensor 90 and processes them to a suitable data format in a signal processor 91. The processed master attitude measurements $Y_m$ and a master predicted measurement $Y_m*$ are differenced in a master residual computer 92 to form master residuals $R_m$ which are provided to a multiplier 100.

In the slave portions 84 and 86, successive slave attitude measurements $Y_s$ are received from slave attitude sensors 94 and 96 and processed in signal processors 95 and 97. The processed slave attitude measurements $Y_s$ and the master predicted measurement $Y_m*$ are differenced in a slave residual computers 98 and 99 to form slave residuals $R_s$.

In the slave residual processor 85, the first slave residual and the master residual are differenced in a relative attitude generator 101 to form relative slave attitude measurements $Y_{s_{rel}}*$. In response to these relative measurements, a relative attitude estimator 102 derives the first slave relative attitude estimate $X_{s_{rel}}$.

The first slave residual $R_s$ and the first slave relative attitude estimate $X_{s_{rel}}*$ are then differenced in a residual corrector 103 to provide a first corrected slave residual $R_{s_{crctd}}$ to a multiplier 104. With similar structures, the nth slave residual processor 87 generates the nth slave relative attitude estimate $X_{s_{rel}}*$ and provides an nth corrected slave residual $R_{s_{crctd}}$ to a multiplier 106.

The multipliers 100, 104 and 106 receive a gain from a gain calculator 110. Accordingly, the master residual $R_s$, the first corrected slave residual $R_{s_{crctd}}$ and the nth corrected slave residual $R_{s_{crctd}}$ are multiplied by the gain to respectively derive a master correction $C_m$, a first slave correction $C_{s_1}$ and an nth slave correction $C_{s_n}$ which are combined in a correction combiner 112 to provide a master combined correction $C_{m_{cmbnd}}$ to a summer 114.

An attitude and bias propagator 116 preferably receives attitude rate measurements $Y_{m_r}$ from an attitude rate sensor 118 and a corresponding signal processor 119 and provides the predicted master attitude measurements $Y_m*$ to the summer 114, the master residual computer 92, the first slave residual computer 98 and the nth slave residual computer 99. In response to the combined correction $C_{m_{cmbnd}}$ and the predicted master attitude measurements $Y_m*$, the summer generates the master attitude estimate $X_m$.

The master residual computer 92, the gain calculator 110, the multiplier 100, the residual combiner 112, the summer 114 and the attitude and bias propagator 116 form a measurement filter 120 such as a Kalman filter. The filter successively processes attitude measurements which have measurement variances $\sigma_m^2$ into attitude estimates whose estimate variances $\sigma_{x*}^2$ are less than the measurement variances.

In particular, a Kalman filter derives the last attitude estimate $X*$ into a predicted attitude $Y*$ which corresponds in time with the next successive attitude measurement $Y$ and which is differenced with that measurement to form a residual $R$. The residual $R$ is multiplied by the gain $K$ to realize a correction $C$ which is used to update the predicted attitude $Y*$ into an updated attitude estimate $X*$.

The Kalman gain $K$ is essentially a ratio of the system's estimate variance $\sigma_{x*}^2$ to the sum of its estimate variance $\sigma_{x*}^2$ and its measurement variance $\sigma m_m^2$. In the beginning of the estimate process, the estimate variance $\sigma_{x*}^2$ is large so that the gain $K$ approaches one and the correction $C$ is substantially equal to the residual $R$. That is, more weight is given to the most recent measurement $Y$ than to the latest estimate $X*$. As the estimate process continues, the estimate variance $\sigma_{x*}^2$ reduces below the measurement variance $\sigma_m^2$ (i.e., the estimate becomes more accurate than the measurement) and the correction $C$ is a small portion of the residual $R$. That is, more weight is given to the latest estimate than to the most recent measurement.

In operation of the attitude determination system 60, the master combined correction $C_{m_{cmbnd}}$ is determined in response to the master residual $R_m$ and the corrected slave residuals $R_{s_{crctd}}$. As noted above, the uplink and downlink payloads 44 and 46 of FIG. 2 are separated by a body space 47 so that error sources such as initial alignment and thermal deformation generate a relative alignment error between the payloads. Accordingly, effects of this relative alignment error must be removed from the slave attitude measurements $Y_s$ before their respective slave residuals $R_s$ can be combined with the master residual $R_m$.

The errors corresponding to the first slave sensor 94 are removed in the first slave residual processor 85. In operation of this processor, the relative attitude generator 101 differences the master residual $R_m$ and the first slave residual $R_s$ to generate successive slave relative attitude measurements $Y_{s_{rel}}$. The relative attitude estimator 102 is a filter (e.g., average-down filter or low-pass filter) which generates the first slave relative attitude estimate $X_{s_{rel}}$ in response to a plurality of successive slave relative attitude measurements $Y_{s_{rel}}$. The residual corrector 103 then differences the first slave residual $R_S$ and the first slave relative attitude estimate $X_s rel*$ to provide the first corrected slave residual $R_{s_{crctd}}$ to the multiplier 104. Attitude errors that correspond to the body space (47 in FIG. 2) have thus been removed and the corrected slave residual $R_{s_{crctd}}$ can be used with the master residual $R_m$ in the filter 120.

After the corrected slave residual is converted into a first slave correction $C_{s_1}$ in the multiplier 104 it is combined with the nth slave correction $C_{s_n}$ and the master correction $C_m$ in the correction combiner 112 to provide the combined correction $C_{cmbnd}$. The correction combiner 112 permits an attitude control designer to assign different weights to the master and slave corrections and thus tailor the combined correction $C_{cmbnd}$ to system needs. In an exemplary system, the master and slave corrections are assigned equal weights.

Figure 4:
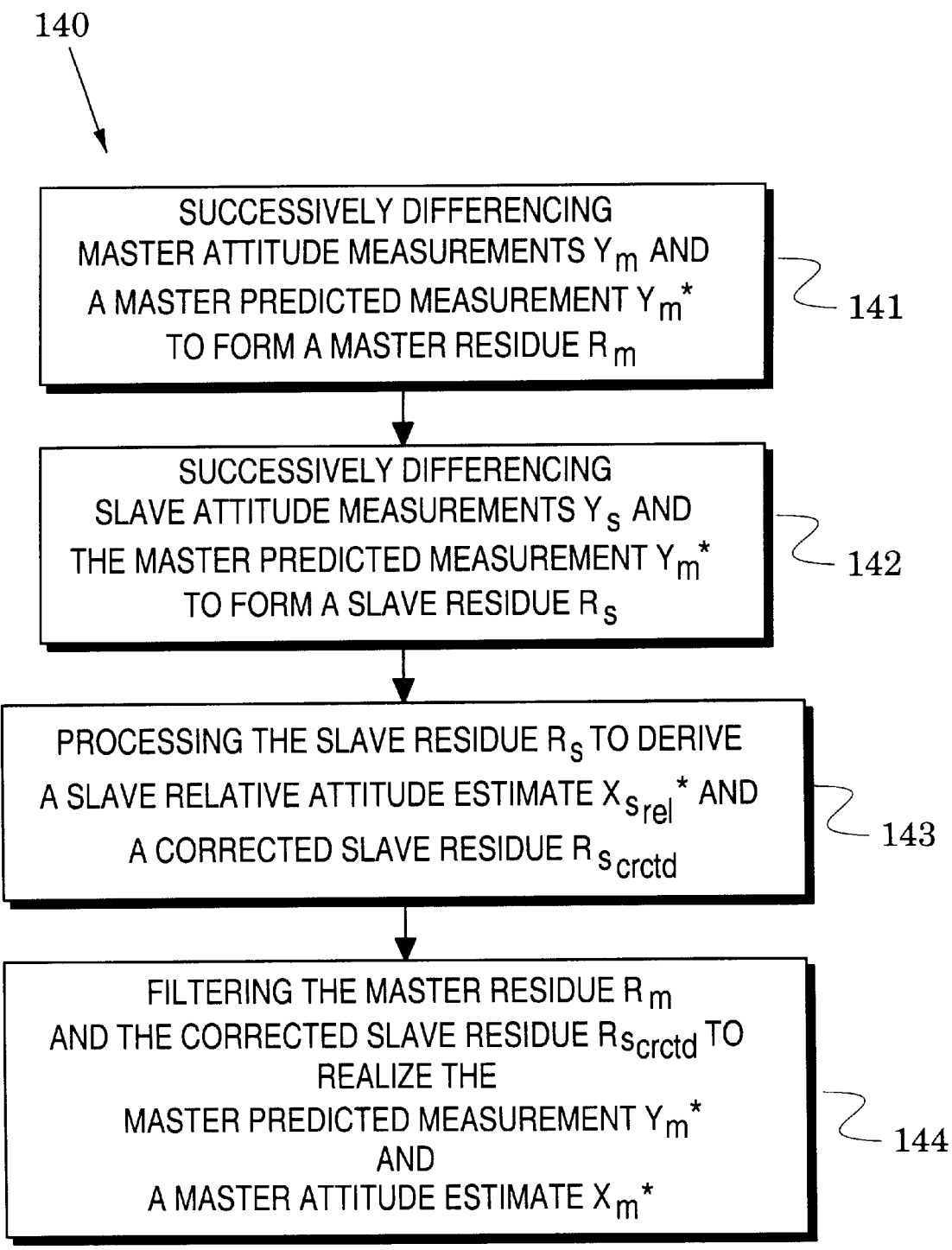
FIG. 4 is a flow chart that illustrates an attitude determination method that is practiced with the spacecraft structures of FIGS. 2 and 3.

The flow chart 140 of FIG. 4 illustrates an attitude determination method that can be practiced with the attitude determination system 60 of FIG. 3. A process step 141 of this method successively differences master attitude measurements $Y_m$ and a master predicted measurement $Y_m*$ to form a master residual $R_m$. Another process step 142 successively differences slave attitude measurements $Y_s$ and the master predicted measurement $Y_m*$ to form a slave residual $R_s$.

The slave residual $R_s$ is then processed in step 143 to derive a slave relative attitude estimate $X_{s_{rel}}*$ and a corrected slave residual $R_{s_{crctd}}$ that removes the measurement error of the relative attitude. The master residual $R_m$ and the corrected slave residual $R_{s_{crctd}}$ are then filtered in process step 144 to realize the master predicted measurement $Y_m^*$ and a master attitude estimate $X_m^*$.

The attitude determination system 60 of FIG. 3 provides an integrated attitude determination architecture that combines attitude measurements from all payloads of a multiple-payload spacecraft to determine attitudes of each payload. In particular, master attitude and relative slave attitudes are determined. If desired, absolute slave attitudes can be easily found from the master attitude and the relative slave attitudes. The master and slave attitude estimates are then used to control the attitudes of spacecraft elements (e.g., the body 41 and the antenna beams of the uplink and downlink antennas 50 and 54 of FIG. 2) that correct the absolute and relative attitude errors. Although FIG. 2 illustrates exemplary uplink and downlink payloads 44 and 46, other embodiments of the invention can include the spacecraft body (often referred to as the spacecraft bus) as another "payload".

It has been found that systems of the invention significantly enhance the accuracy of the attitude estimates (e.g., by an order of magnitude) when compared to systems that independently determine payload attitudes. In addition, it has been found that estimating relative slave attitudes provides significant processing advantages (e.g., simpler algorithms, reduced data throughput and slower processing rate) when compared to other methods.

The filter 120 of FIG. 3 can be realized in various Kalman embodiments that include a six state filter which generates attitude and gyroscope bias estimate corrections along three spacecraft axes (e.g., roll, pitch and yaw axes) and a fifteen state Kalman filter that generates, in addition, gyroscope scale factor and misalignment estimate corrections along three spacecraft axes.

In contrast to a Kalman filter which is structured to successively reduce its gain to a steady state value, the filter 120 can also be realized as a fixed-gain filter which uses one or more predetermined gains. An exemplary fixed-gain filter is a six state filter that generates attitude and gyroscope bias estimate corrections with fixed or variable gains that are provided by a data processor that is programmed with algorithms based on Kalman filter teachings.

Attitude determination systems of the invention can respond to various combinations of various attitude sensors (e.g., beacon sensor, star tracker, sun sensor, earth sensor and gyroscopes). In an exemplary combination, the master attitude sensor 90 of FIG. 1 is a beacon sensor, the first slave attitude sensor 94 is a star tracker and the attitude rate sensor 118 is a 3-axis gyroscope triad. The beacon sensor and the gyroscope triad are associated with the master payload (44 in FIG. 2) and the star tracker is associated with the slave payload (46 in FIG. 2).

Attitude determination systems of the invention preferably include at least one data processor which is programmed to execute the attitude determination methods. Because systems of the invention may involve various attitude frames (e.g., a beacon sensor frame, a star tracker frame and a body frame), these methods may include coordinate transformation processes. They may also include appropriate processes (e.g., directional cosine matrix and quaternion computations) for the differencing operations of the invention.

A common design can be used for the relative attitude estimators of the invention (e.g., 102 of FIG. 3). In addition to generating the first slave relative attitude estimate, these relative attitude estimators can also store parameters of a thermal deformation model of the spacecraft and these parameters can be substituted in the attitude determination system if a corresponding attitude sensor should fail.

The preferred embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of determining the attitude of a master payload and at least one slave payload of a spacecraft, the method comprising the steps of:

successively differencing master attitude measurements $Y_m$ and a master predicted measurement $Y_m^*$ to form a master residual $R_m$;

successively differencing slave attitude measurements $Y_s$ and said master predicted measurement $Y_m^*$ to form a slave residual $R_s$;

processing said slave residual $R_s$ to derive a slave relative attitude estimate $X_{s_{rel}}^*$ and a corrected slave residual $R_{s_{crctd}}$; and filtering said master residual $R_m$ and said corrected slave residual $R_{s_{crctd}}$ to realize said master predicted measurement $Y_m^*$ and a master attitude estimate $X_m^*$;

attitudes of said master payload and said slave payload thereby determined by said master attitude estimate $X_m^*$ and said slave relative attitude estimate $X_{s_{rel}}^*$.

2. The method of claim 1, wherein said differencing steps include the step of generating said master attitude measurements $Y_m$ and said slave attitude measurements $Y_s$ with at least one master attitude sensor that is proximate to said master payload and at least one slave attitude sensor that is proximate to said slave payload.

3. The method of claim 2, wherein each of said master attitude sensor and said slave attitude sensor is at least one of a beacon sensor, a star tracker, a sun sensor and an earth sensor.

4. The method of claim 2, wherein said processing step includes the steps of:

successively differencing said master residual $R_m$ and said slave residual $R_s$ to form slave relative attitude measurements $Y_{s_{rel}}$;

in response to said slave relative attitude measurements $Y_{s_{rel}}$, estimating said slave relative attitude estimate $X_{s_{rel}}^*$; and successively differencing said slave residual $R_s$ and said slave relative attitude estimate $X_{s_{rel}}^*$ to form said corrected slave residual $R_{s_{crctd}}$.

5. The method of claim 1, wherein said filtering step includes the steps of:

with a filter gain, converting said master residual $R_m$ to a master correction $C_m$;

with said filter gain, converting said corrected slave residual $R_{s_{crctd}}$ to a slave correction $C_s$;

combining said master correction $C_m$ and said slave correction $C_s$ to realize a combined master correction $C_{m_{cmbnd}}$; and updating said master attitude estimate $X_m^*$ with said master correction $C_{m_{cmbnd}}$.

6. The method of claim 1, wherein said filtering step includes the step of deriving said master attitude estimate $X_m$ to realize said master predicted measurement $Y_m^*$.

7. The method of claim 6, wherein said deriving step includes the step of providing master attitude rate measurements $Y_{m_{rt}}$ with at least one gyroscope.

8. The method of claim 1, wherein said filtering step includes the step of estimating said master predicted measurement $Y_m^*$ and said master attitude estimate $X_m^*$ with a Kalman filter.

9. The method of claim 1, wherein said filtering step includes the step of estimating said master predicted measurement $Y_m^*$ and said master attitude estimate $X_m^*$ with a filter that determines corrections with at least one predetermined gain.

10. The method of claim 1, further including the step of combining said master attitude estimate $X_m^*$ and said slave relative attitude estimate $X_{s_{rel}}^*$ to realize a slave attitude estimate $X_s^*$.

11. The method of claim 1, further including the step of adjusting the attitude of said spacecraft in response to said master attitude estimate $X_m^*$ and said slave relative attitude estimate $X_{s_{rel}}^*$.

12. A method of determining the attitude of a master payload and at least one slave payload of a spacecraft, the method comprising the steps of:
   successively differencing master attitude measurements $Y_m$ and a master predicted measurement $Y_m^*$ to form a master residual $R_m$;
   successively differencing slave attitude measurements $Y_s$ and said master predicted measurement $Y_m^*$ to form a slave residual $R_s$;
   successively differencing said master residual $R_m$ and said slave residual $R_s$ to form slave relative attitude measurements $Y_{s_{rel}}$;
   in response to said slave relative attitude measurements $Y_{s_{rel}}$, estimating a slave relative attitude estimate $X_{s_{rel}}$;
   successively differencing said slave residual $R_s$ and said slave relative attitude estimate $X_{s_{rel}}$ to form a corrected slave residual $R_{s_{crctd}}$; and
   filtering said master residual $R_m$ and said corrected slave residual $R_{s_{crctd}}$ to estimate said master predicted measurement $Y_m^*$ and a master attitude estimate $X_m^*$;
   attitudes of said master payload and said slave payload thereby determined by said master attitude estimate $X_m^*$ and said slave relative attitude estimate $X_{s_{rel}}^*$.

13. The method of claim 12, wherein said differencing steps include the step of generating said master attitude measurements $Y_m$ and said slave attitude measurements $Y_s$ with at least one master attitude sensor that is proximate to said master payload and at least one slave attitude sensor that is proximate to said slave payload.

14. The method of claim 13, wherein each of said master attitude sensor and said slave attitude sensor is at least one of a beacon sensor, a star tracker, a sun sensor and an earth sensor.

15. The method of claim 12, wherein said filtering step includes the steps of:
   with a filter gain, converting said master residual $R_m$ to a master correction $C_m$;
   with said filter gain, converting said corrected slave residual $R_{s_{crctd}}$ to a slave correction $C_s$;
   combining said master correction $C_m$ and said slave correction $C_s$ to realize a combined master correction $C_{m_{cmbnd}}$; and
   updating said master attitude estimate $X_m$ with said master correction $C_{m_{cmbnd}}$.

16. The method of claim 12, wherein said filtering step includes the step of deriving said master attitude estimate $X_m$ to realize said master predicted measurement $Y_m^*$.

17. The method of claim 16, wherein said deriving step includes the step of providing master attitude rate measurements $Y_{m_{rt}}$ with at least one gyroscope.

18. The method of claim 12, wherein said filtering step includes the step of estimating said master predicted measurement $Y_m^*$ and said master attitude estimate $X_m^*$ with a Kalman filter.

19. The method of claim 12, wherein said filtering step includes the step of estimating said master predicted measurement $Y_m^*$ and said master attitude estimate $X_m^*$ with a filter that determines corrections with at least one predetermined gain.

20. A spacecraft, comprising:
   a satellite body;
   a master payload carried by said body;
   at least one slave payload carried by said body;
   an attitude control system that includes:
      a) at least one master attitude sensor proximate to said master payload; and
      b) at least one slave attitude sensor proximate to said slave payload;
   at least one solar panel carried by said body to provide power to said attitude control system; and
   at least one data processor in said attitude control system that is programmed to perform the steps of:
      a) successively differencing a master predicted measurement $Y_m^*$ and master attitude measurements $Y_m$ from said master attitude sensor to form a master residual $R_m$;
      b) successively differencing said master predicted measurement $Y_m^*$ and slave attitude measurements $Y_s$ from said slave attitude sensor to form a slave residual $R_s$;
      c) processing said slave residual $R_s$ to derive a slave relative attitude estimate $X_{s_{rel}}^*$ and a corrected slave residual $R_{s_{crctd}}$;
      d) filtering said master residual $R_m$ and said corrected slave residual $R_{s_{crctd}}$ to realize said master predicted measurement $Y_m^*$ and a master attitude estimate $X_m^*$; and
      e) in response to said master attitude estimate $X_m^*$ and said slave relative attitude estimate $X_{s_{rel}}^*$, controlling the attitude of said master and slave payloads with said attitude control system.

21. The spacecraft of claim 20, wherein each of said master attitude sensor and said slave attitude sensor is at least one of a beacon sensor, a star tracker, a sun sensor and an earth sensor.

22. The spacecraft of claim 20, wherein said processing step includes the steps of:
   successively differencing said master residual $R_m$ and said slave residual $R_s$ to form slave relative attitude measurements $Y^{s_{rel}}$;
   in response to said slave relative attitude measurements $Y_{s_{rel}}$, estimating said slave relative attitude estimate $X_{s_{rel}}$; and
   successively differencing said slave residual $R_s$ and said slave relative attitude estimate $X_{s_{rel}}$ to form said corrected slave residual $R_{s_{crctd}}$.

23. The spacecraft of claim 20, wherein said filtering step includes the steps of:
   with a filter gain, converting said master residual $R_m$ to a master correction $C_m$;

with said filter gain, converting said corrected slave residual $R_{s_{crctd}}$ to a slave correction $C_s$;

combining said master correction $C_m$ and said slave correction $C_s$ to realize a combined master correction $C_{m_{cmbnd}}$; and updating said master attitude estimate $X_m^*$ with said master correction $C_{m_{cmbnd}}$.

24. The spacecraft of claim 20, wherein said filtering step includes the step of deriving said master attitude estimate $X_m$ to realize said master predicted measurement $Y_m^*$.

25. The spacecraft of claim 24, further including wherein said deriving step includes at least one gyroscope that provides master attitude rate measurements $Y_{m_{rt}}$ that facilitate said deriving step.

26. The spacecraft of claim 20, wherein said attitude control system includes a torque generation system that is coupled to generate torques in said spacecraft to facilitate said controlling step.

27. The spacecraft of claim 26, wherein said torque generation system includes a momentum wheel.

28. The spacecraft of claim 20, wherein said torque generation system includes a thruster.

* * * * *